United States Patent
Can et al.

(10) Patent No.: US 7,746,815 B2
(45) Date of Patent: Jun. 29, 2010

(54) HYBRID FORWARDING APPARATUS AND METHOD FOR COOPERATIVE RELAYING IN AN OFDM NETWORK

(75) Inventors: Basak Can, Aalborg (DK); Hiroyuki Yomo, Aalborg (DK); Elisabeth de Carvalho, Aalborg (DK); Kathiravetpillai Sivanesan, Suwon-si (KR); Do-Young Kim, Yongin-si (KR); Marcos Daniel Katz, Suwon-si (KR); Dong-Seek Park, Yongin-si (KR); Sung-Kwon Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 11/526,125

(22) Filed: Sep. 22, 2006

(65) Prior Publication Data

US 2007/0086512 A1    Apr. 19, 2007

Related U.S. Application Data

(60) Provisional application No. 60/720,022, filed on Sep. 23, 2005.

(51) Int. Cl.
*H04J 3/08* (2006.01)
(52) U.S. Cl. .................. 370/315; 370/208; 370/339; 370/334; 370/299
(58) Field of Classification Search ............. 370/208, 370/204, 205, 316, 339, 334, 33, 315, 299
See application file for complete search history.

(56) References Cited

U.S. PATENT DOCUMENTS

| | | | | |
|---|---|---|---|---|
| 5,479,443 | A * | 12/1995 | Kagami et al. | 375/211 |
| 6,751,187 | B2 * | 6/2004 | Walton et al. | 370/210 |
| 6,769,089 | B1 * | 7/2004 | Gupta | 714/786 |
| 7,489,746 | B1 * | 2/2009 | Awater et al. | 375/341 |

(Continued)

FOREIGN PATENT DOCUMENTS

| EP | 1032150 | * 6/2000 |
|---|---|---|
| KR | 1019990048389 | 7/1999 |
| KR | 1020040099878 | 12/2004 |
| KR | 1020050088330 | 9/2005 |

OTHER PUBLICATIONS

Ingmar et al. 9 "Cooperative Diversity By ReLay Phase Rotation in Block Fading Enviroments"); 2004; IEEE Workshop; pp. 1-5.*

*Primary Examiner*—Ricky Ngo
*Assistant Examiner*—Dewanda Samuel
(74) *Attorney, Agent, or Firm*—The Farrell Law Firm, LLP

(57) ABSTRACT

A hybrid forwarding apparatus and method for cooperative relaying in an OFDM network are provided. In a hybrid forwarding apparatus in a relay terminal, a forwarding scheme selector selects a forwarding scheme for transmission. An amplify and forward (AF) block amplifies data received from the forwarding scheme selector, if an AF scheme is selected. A decode and forward (DF) block decodes and encodes data received from the forwarding scheme selector, if a DF scheme is selected. A multiplexer provides the output data of the AF block and the DF block to an OFDM modulator.

12 Claims, 13 Drawing Sheets

U.S. PATENT DOCUMENTS

| | | |
|---|---|---|
| 7,493,405 B2 * | 2/2009 | Lopes et al. ............... 709/230 |
| 2004/0042556 A1 * | 3/2004 | Medvedev et al. .......... 375/260 |
| 2004/0266339 A1 * | 12/2004 | Larsson ....................... 455/7 |
| 2005/0190849 A1 * | 9/2005 | McNamara ................ 375/267 |
| 2006/0002486 A1 * | 1/2006 | van Nee ..................... 375/260 |
| 2007/0011550 A1 * | 1/2007 | Agrawal et al. ............. 714/746 |

* cited by examiner

US 7,746,815 B2

HYBRID FORWARDING APPARATUS AND METHOD FOR COOPERATIVE RELAYING IN AN OFDM NETWORK

PRIORITY

This application claims priority under 35 U.S.C. §119 to a U.S. Provisional Patent Application entitled "Hybrid Forwarding Scheme for Cooperative Relaying in OFDM Based Networks" filed on Sep. 23, 2005 and assigned Ser. No. 60/720,022, the contents of which are incorporated herein by reference.

BACKGROUND OF THE INVENTION

1. Field of the Invention

The present invention relates generally to an Orthogonal Frequency Division Multiplexing (OFDM) network, and in particular, to a hybrid forwarding apparatus and method for cooperative relaying using relay terminals.

2. Description of the Related Art

Increased frequency utilization and improved Quality of Service (QoS) performance are requisite for the evolution of mobile communication systems from $2^{nd}$ Generation (2G) and 3G systems to 4G systems.

A Single-Input Single-Output (SISO) scheme is not practical due to its limited frequency use in fulfilling requirements for data rate and stability.

New transmission strategies are required to satisfy QoS requirements. Multiple antenna techniques, such as a Multiple-Input Multiple-Output (MIMO) scheme, are one of these transmission strategies, which increases system capacity.

MIMO has the benefit of huge spectral efficiency in rich-scattering environments. As long as the number of receive antennas is greater than or equal to that of the transmit antennas, capacity increases linearly with the number of transmit antennas.

MIMO provides multiple signatures of the same transmitted signal to the receiver simultaneously through multiple antennas. Each signature is referred to as a diversity branch in the present invention.

As the diversity branches of the same transmitted signal increases, the probability that all the diversity branches will be in deep fade is reduced, leading to an increase in the reliability at the receiver. However, the MIMO technology requires a plurality of antennas at the transmitter, increasing hardware complexity and cost.

Performance improvements through conventional MIMO techniques may not be achieved all the time because the system performance depends strongly on the number of antennas, scattering environment, spatial fading correlations between transmit antennas and receive antennas, and the distance between network elements.

The above-described advantages of the conventional multiple antenna techniques can be achieved through cooperative communications which create a Virtual Antenna Array (VAA). The VAA is created with the help of relay terminals that assist with the communication of any source-destination pair. The term "cooperative communications" refers to the relaying of communication signals between the source terminal and the destination terminal via the relay terminal. Thus, the concept of the VAA achieves the benefits of multiple antenna techniques produced even in the SISO environment.

The virtual antenna role of the VAA in the source terminal or the destination terminal brings an increase in link reliability and the coverage of the system. As a consequence, the outage probability and Bit Error Rate (BER) of communications between the source terminal and the destination terminal can be reduced.

Furthermore, the VAA increases robustness against environmental changes, thereby increasing data rate. For the same data rate, power consumption is reduced.

One of the primary targets of cooperative communications is to increase the reliability of communications between the source terminal and the destination terminal. To achieve the reliability increase, a forwarding scheme that extracts the diversity offered by the VAA needs to be designed.

"Amplify and Forward (AF)" and "Decode and Forward (DF)" are two main forwarding schemes widely used in relay networks.

A relay terminal employing AF amplifies a received signal, prior to forwarding, whereas a relay terminal employing DF decodes, re-encodes and forwards a received signal.

FIG. 1 is a block diagram of a conventional OFDM relay terminal employing AF. While the following description is made in the context of OFDM, the same is applicable to Time Division Duplex-Code Division Multiple Access (TDD-CDMA) or Time Division Duplex-Time Division Multiple Access (TDD-TDMA).

Referring to FIG. 1, in the OFDM relay terminal, a receiver includes a Radio Frequency (RF) processor 122, an OFDM demodulator 120, and a buffer 124. The OFDM demodulator 120 has an Analog-to-Digital Converter (ADC) module, an OFDM demodulation module, and a decoding module.

The RF processor 122 converts an RF signal received through an antenna to an analog baseband signal.

The ADC module in the OFDM demodulator 120 converts the analog signal received from the RF processor 122 to a digital signal. The OFDM demodulation module converts time-domain sample data received from the ADC module to frequency-domain data by Fast Fourier Transform (FFT). The decoding module decodes the frequency-domain data using a predetermined demodulation method and a predetermined coding rate and stores the decoded data in the buffer 124.

A transmitter of the OFDM relay terminal includes an RF processor 112, an OFDM modulator 110, and an AF module 114. The OFDM modulator 110 has a Digital-to-Analog Converter (DAC) module, an OFDM modulation module, and a coding module.

The AF module 114 performs gain amplification for each subcarrier loaded from the buffer 124. The amount of gain amplification is determined according to the Channel State Information (CSI) of the channel where the relay terminal receives data.

In the OFDM modulator 110, the coding module encodes the gain-amplified data using a coding rate and a modulation scheme corresponding to a Modulation and Coding Scheme (MCS) level. The modulation scheme can be Binary Phase Shift Keying (BPSK), Quadrature Phase Shift Keying (QPSK), 16-ary Quadrature Amplitude Modulation (16QAM), or 64QAM. The OFDM modulation module converts the coded data to time-domain sample data (i.e. an OFDM symbol) by Inverse Fast Fourier Transform (IFFT). The DAC module converts the sample data to an analog signal.

The RF processor 112 converts the analog signal to an RF signal and transmits the RF signal through the antenna. An RF switch 130 switches the signal received through the antenna to the receiver, and for data transmission, switches the transmitter to the antenna.

FIG. 2 is a block diagram of a conventional OFDM relay employing DF. While the following description is made in the context of OFDM, the same is applicable to TDD-CDMA or TDD-TDMA.

Referring to FIG. 2, in the OFDM relay, a receiver includes the RF processor 122, the OFDM demodulator 120, a detector 240, a decoder 270, and a buffer 280. The OFDM demodulator 120 has an ADC module, an OFDM demodulation module, and a decoding module.

The RF processor 122 converts an RF signal received through an antenna to an analog baseband signal. The ADC module in the OFDM demodulator 120 converts the analog signal received from the RF processor 122 to a digital signal. The OFDM demodulation module converts time-domain sample data received from the ADC module to frequency-domain data by FFT. The decoding module decodes the frequency-domain data using a predetermined demodulation method and a predetermined coding rate.

The detector 240 detects the signal it receives based on the CSI of the channel on which it receives data.

After detection, if the source terminal employs channel coding, the decoder decodes the data received form the detector 240 and stores the decoded data in a buffer 280.

A transmitter of the OFDM relay includes the RF processor 112, the OFDM modulator 110, a subcarrier symbol mapper 230, and an encoder 260. The OFDM modulator 110 has a DAC module, an OFDM modulation module, and a coding module.

The encoder 260 re-encodes data loaded from the buffer 280, if the data was decoded in the decoder 270. The subcarrier symbol mapper 230 maps the re-coded data to subcarriers and provides the mapped data in parallel to the OFDM modulator 110.

In the OFDM modulator 110, the coding module encodes the mapped data using a coding rate and a modulation scheme corresponding to an MCS level. The modulation scheme can be BPSK, QPSK, 16QAM or 64QAM. The OFDM modulation module converts the coded data to time-domain sample data (i.e. an OFDM symbol) by IFFT. The DAC module converts the sample data to an analog signal.

The RF processor 112 converts the analog signal to an RF signal and transmits the RF signal through the antenna. The RF switch 130 switches the signal received through the antenna to the receiver, and for data transmission, switches the transmitter to the antenna.

Coding in the encoder 260 and decoding in the decoder 270 are optional and represented by dotted boxes.

AF is normally affected by noise enhancement at the relay terminal and DF is significantly influenced by the error propagation at the relay terminal. As the OFDM subcarriers undergo independent fading, some subcarriers may provide better results for AF protocol and some other subcarriers may provide better results for DF protocol. Sometimes the direct transmission may provide better results than the relaying with AF and DF.

Thus, there is a need for a technique which selects the AF for those subcarriers which provide better results for AF, select DF for those subcarriers which provide better results for DF and selects the direct transmission for some subcarriers for which it provides better results in a hybrid fashion for a OFDM system over frequency selective fading environment.

SUMMARY OF THE INVENTION

An object of the present invention is to substantially solve at least the above problems and/or disadvantages and to provide at least the advantages below. Accordingly, an object of the present invention is to provide a hybrid forwarding apparatus and method using cooperative relaying in an OFDM network.

The above object is achieved by providing a hybrid forwarding apparatus and method for cooperative relaying in an OFDM network.

According to one aspect of the present invention, in a hybrid forwarding apparatus for relaying data in a relay terminal in an OFDM network, a forwarding scheme selector selects a forwarding scheme for transmission. An AF block amplifies data received from the forwarding scheme selector, if an AF scheme is selected. A DF block decodes and encodes data received from the forwarding scheme selector, if a DF scheme is selected. A multiplexer provides the output data of the AF block and the DF block to an OFDM modulator.

According to another aspect of the present invention, in a hybrid forwarding method for relaying data in a relay terminal in an OFDM network, the bit error probabilities of an AF scheme, a decode and forward (DF) scheme, and a direct transmission scheme without relaying are calculated based on the CSI of received data. If the AF scheme has the lowest bit error probability, the AF scheme is selected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
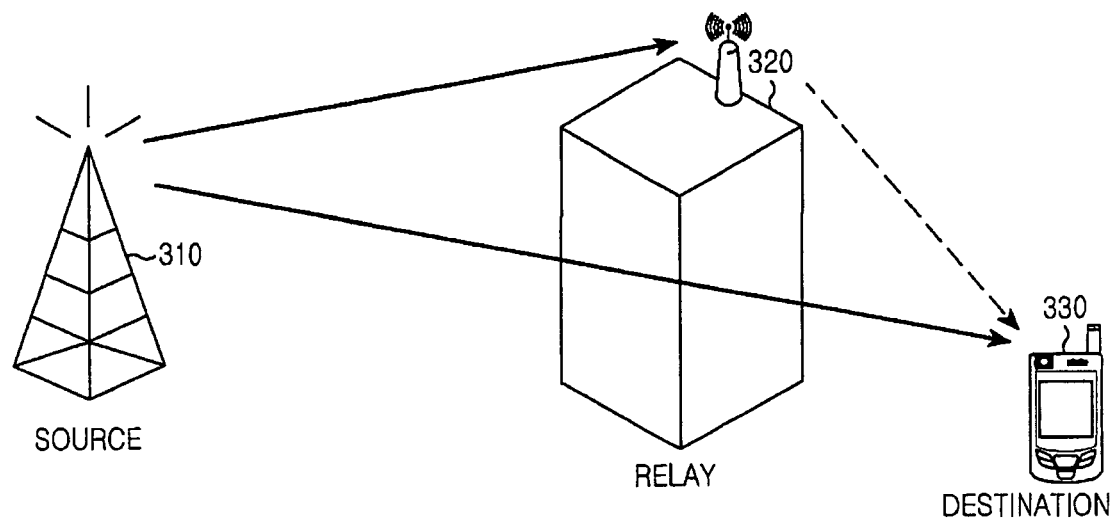
FIG. 3 illustrates a network configuration according to the present invention.

FIG. 3 illustrates a network configuration according to the present invention.

Referring to FIG. 3, the following description focuses on the downlink in the context of a terminal with a single antenna. A source terminal 310 is a base station and a destination terminal 330 is a user. A relay terminal 320 forwards a signal received from the source terminal 310 to the destination terminal 330.

Figure 4:
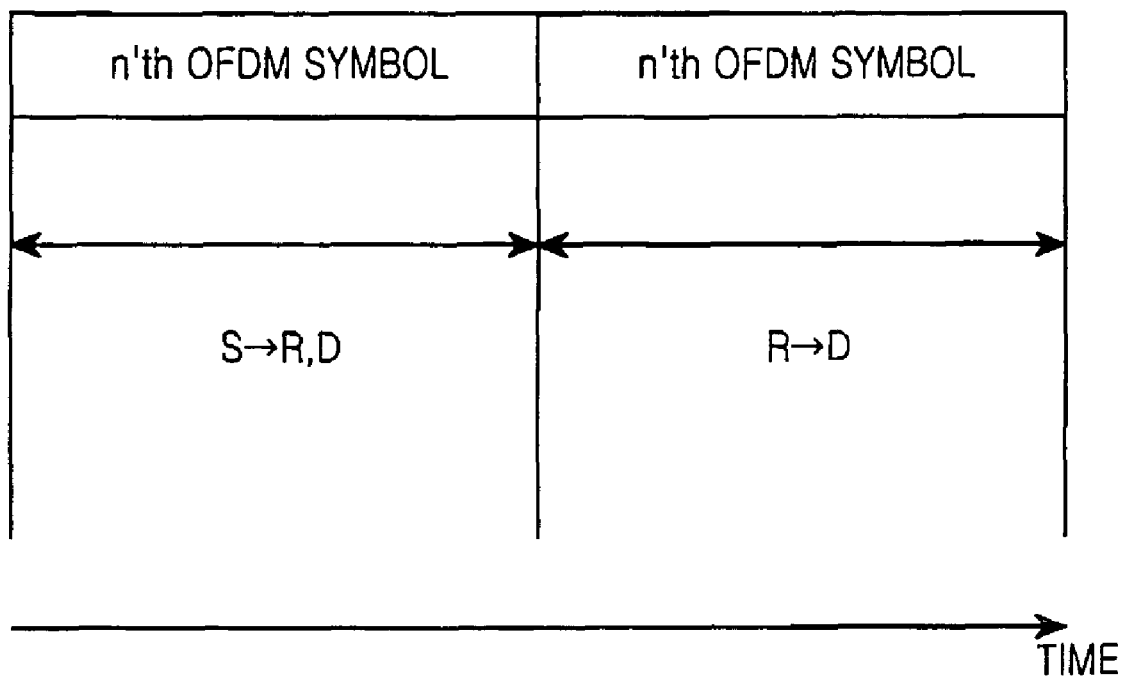
FIG. 4 illustrates a channel transmitted in time division according to the present invention.

FIG. 4 illustrates a channel transmitted in time division according to the present invention.

Referring to FIG. 4, an index n (n∈{2k+1: k∈{0, 1, 2, 3, . . . }}) represents the index of an OFDM symbol transmitted by the source terminal 310.

In an odd time slot, the source terminal 310 transmits symbols on all subcarriers and the relay terminal 320 and the destination terminal 330 listen to this transmission. In an even time slot, the source terminal 310 discontinues transmission, and the relay terminal 320 forwards the symbols received in the previous time slot to the destination terminal 330.

The present invention is based on the assumption that the relay terminal 320 forwards symbols on all subcarriers. In the even time slot, only the destination terminal 330 receives the forwarded symbols from the relay terminal 320. This channel configuration leads to the creation of a virtual receive diversity channel.

In order to make comparisons among AF, DF and direct transmission, the data rates and total transmit power are kept the same for direct transmission and relaying in the present invention.

For the direct transmission scheme, BPSK is used and the source terminal 310 transmits symbols in both the odd and even time slots. For the relayed schemes, QPSK is used.

A hybrid forwarding algorithm for the system having the configurations illustrated in FIGS. 3 and 4 is described as follows.

The relay terminal 320 is informed of the Signal-to-Noise Ratios (SNRs) of the symbols of all subcarriers in the S→D, R→D, and S→R links. The SNR measurements are fed back to the relay terminal 320 on a virtual diversity channel.

S, R and D denote the source terminal 310, the relay terminal 320, and the destination terminal 330, respectively. Hence, S→D represents the link from the source terminal 310 to the destination terminal 330, R→D represents the link from the relay terminal 320 to the destination terminal 330, and S→R represents the link from the source terminal 310 to the relay terminal 320.

The relay terminal 320 calculates bit error probability per subcarrier for the individual AF, DF and direct transmission schemes.

Let each of these probabilities be represented by $P_e^{AF}$, $P_e^{DF}$ and $P_e^{SD}$ respectively. $P_e^{AF}$ is given by Equation (1):

$$P_e^{AF} = Q\left(\sqrt{\gamma_s^{AF}}\right), \gamma_s^{AF} = \frac{\left(\gamma_{SD} + \frac{\gamma_{SR}\gamma_{RD}}{1+\gamma_{SR}}\right)^2}{\gamma_{SD} + \frac{\gamma_{SR}\gamma_{RD}}{1+\gamma_{SR}} + \gamma_{SD} + \frac{\gamma_{RD}^2\gamma_{SR}}{(1+\gamma_{SR})^2}} \quad (1)$$

where Q( ) represents Gaussian tail probability function.
$P_e^{DF}$ is given by Equation (2):

where Q( ) represents the Gaussian tail probability function.
$P_e^{SD}$ is given by Equation (3):

$$P_e^{SD} = \left\{Q\left(\sqrt{\frac{\gamma_{SD}+\gamma_{RD}}{2}}\right)\right\} \quad (3)$$

where Q( ) represents the Gaussian tail probability function.

For a combination of hybrid forwarding and direct transmission, the minimum bit error probability is computed by Equation (4):

$$P_e^{HF} = \min\left(P_e^{AF}, P_e^{DF}, P_e^{SD}\right) \quad (4)$$

In Equations (1), (2) and (3), $\gamma_{SR}$, $\gamma_{SD}$ and $\gamma_{RD}$ represent SNRs for a given subcarrier on the S→R, S→D, and R→D links, respectively.

Let the average transmit power levels of the source terminal 310 and the relay terminal 320 be denoted by $E_S/T_S$ and $E_R/T_S$, respectively. Then an average transmit power per QPSK symbol is calculated by Equation (5):

$$P_T^{COOP} = \frac{(E_S + E_R)}{2T_S} \quad (5)$$

where $T_S$ denotes a symbol period and is multiplied by ½ because the source terminal 310 and the relay terminal 320 each transmit in a half of a transmission time interval.

$P_T^{COOP}$ and $\gamma_{RD}$ increase linearly with any increase in the transmit power of the relay terminal 320. For a comparison with the direct transmission scheme, the effect of this increase in $P_T^{COOP}$ due to an increase in the transmit power of the relay terminal 320 must be recast to the transmit power of the destination terminal 330 operating in the direct transmission scheme as described in Equation (3).

For a given subcarrier, the relay terminal 320 selects a forwarding scheme that provides a minimum bit error probability as follows.

If $P_e^{HF} = P_e^{AF}$, then the relay terminal 320 selects AF for the subcarrier.

If $P_e^{HF} = P_e^{DF}$, then the relay terminal 320 selects DF for the subcarrier.

If $P_e^{HF} = P_e^{SD}$, the relay terminal 320 discontinues relaying of the subcarrier.

The relay terminal 320 informs the destination terminal 330 of the type of a forwarding scheme selected for each subcarrier. This information needs to be transmitted only when a forwarding scheme is changed for each subcarrier. Upon receipt of the information about the changed forwarding scheme, the destination terminal 330 applies the new forwarding scheme.

Figure 5:
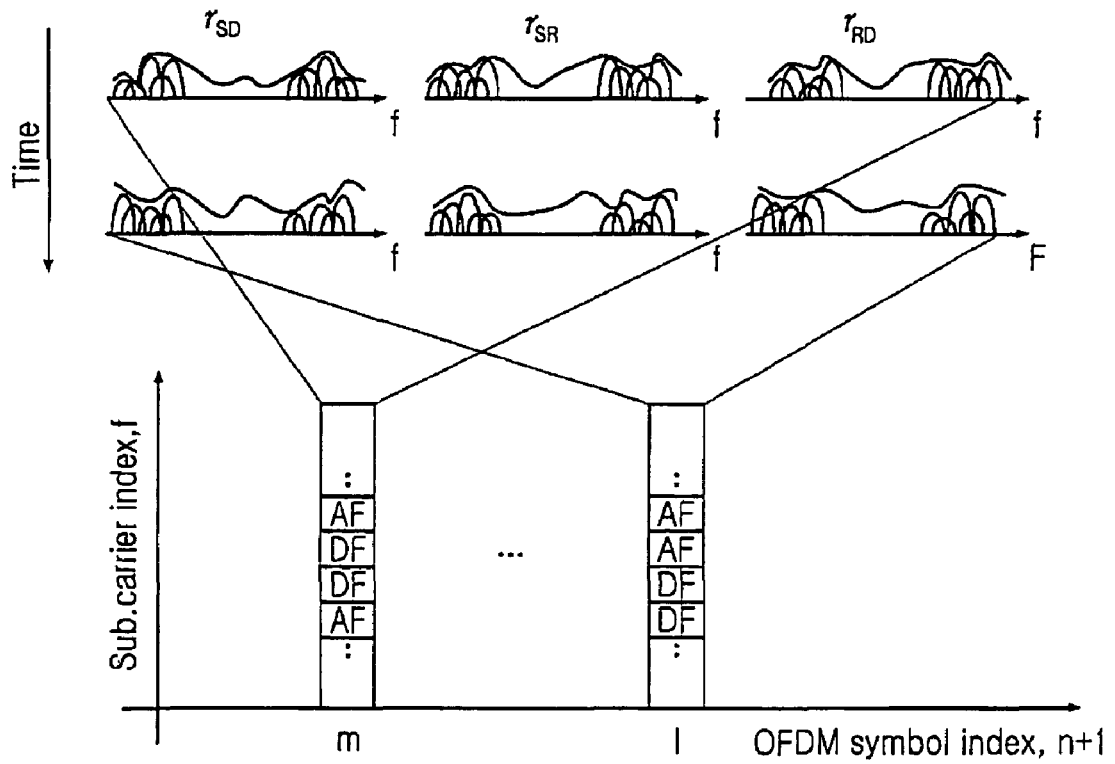
FIG. 5 illustrates hybrid forwarding for each subcarrier in a relay terminal according to the present invention.

FIG. 5 illustrates hybrid forwarding for each subcarrier in the relay terminal according to the present invention.

Referring to FIG. 5, at an $m^{th}$ slot, each subcarrier has different SNRs in the S→R, S→D and R→D links. Thus the $$P_e^{DF} = \begin{cases} (1-Q(\sqrt{\gamma_{SR}}))Q(\sqrt{\gamma_{SD}+\gamma_{RD}}) + Q\left(\frac{\sqrt{(\gamma_{SD}-\gamma_{RD})^2}}{\gamma_{SD}+\gamma_{RD}}\right)Q(\sqrt{\gamma_{SR}}), & \text{if } \gamma_{SD}-\gamma_{RD} \geq 0 \\ (1-Q(\sqrt{\gamma_{SR}}))Q(\sqrt{\gamma_{SD}+\gamma_{RD}}) + \left(1-Q\left(\frac{\sqrt{(\gamma_{SD}-\gamma_{RD})^2}}{\gamma_{SD}+\gamma_{RD}}\right)\right)Q(\sqrt{\gamma_{SR}}), & \text{if } \gamma_{SD}-\gamma_{RD} < 0 \end{cases} \quad (2)$$

relay terminal 320 selects the best forwarding scheme. A predetermined time later, the relay terminal 320 repeats the same operation for an $1^{th}$ slot.

Figure 6:
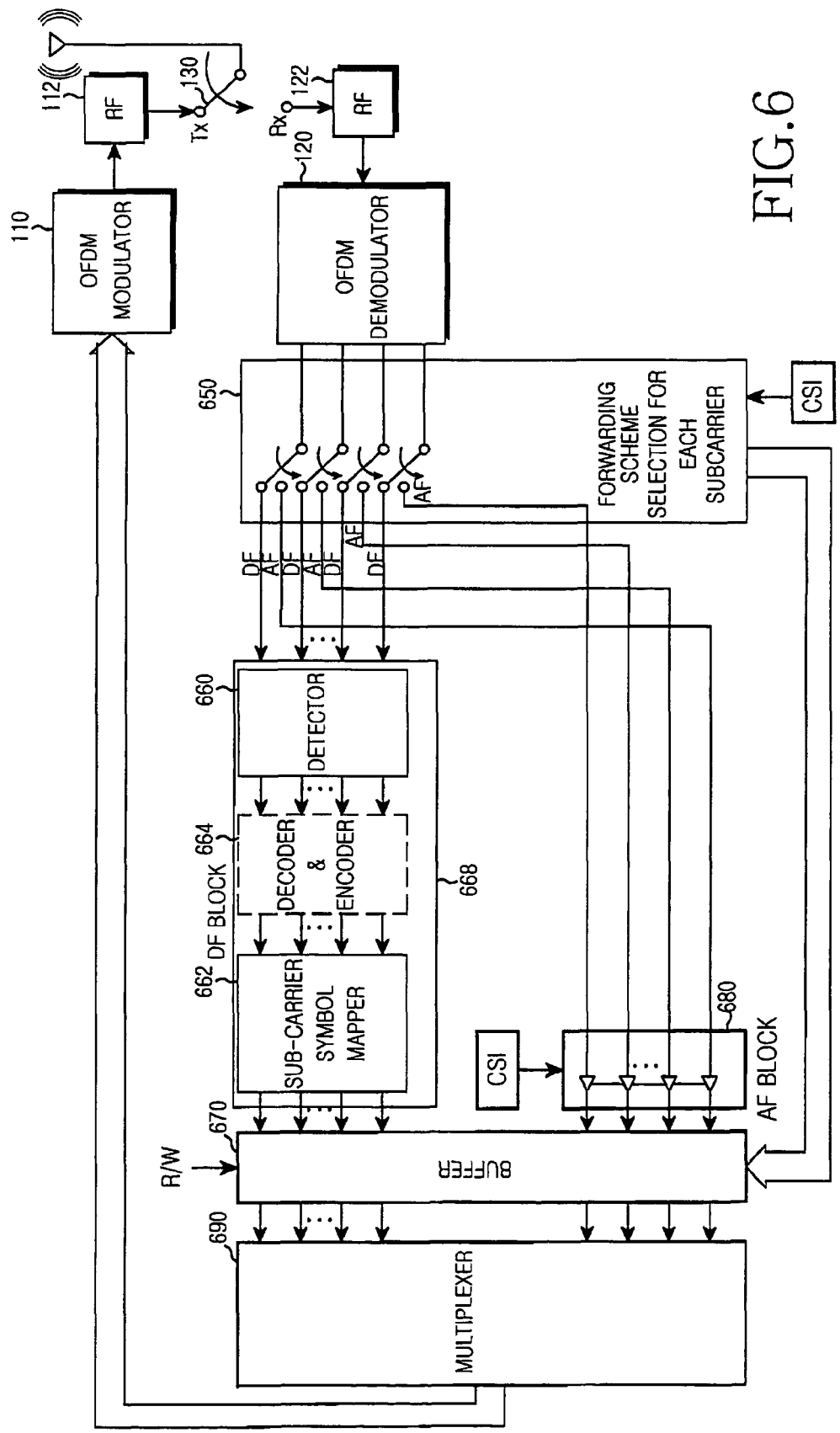
FIG. 6 is a block diagram of the relay terminal according to the present invention.

FIG. 6 is a block diagram of the relay terminal according to the present invention.

Referring to FIG. 6, a forwarding scheme selector 650 calculates the bit error probability of each subcarrier based on its CSI, determines an appropriate forwarding scheme for the subcarrier, and informs a corresponding forwarding block of the selected forwarding scheme.

Figure 2:
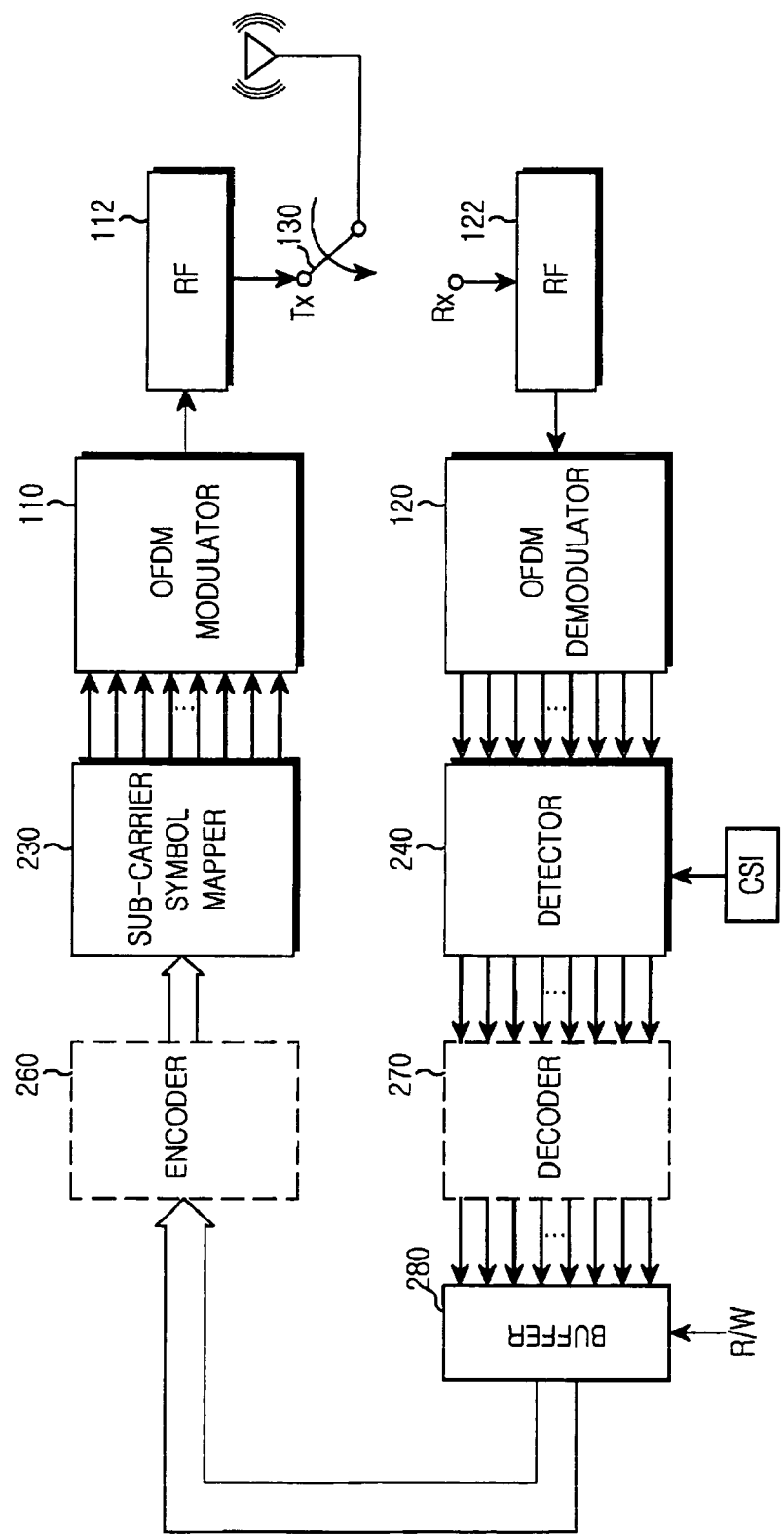
FIG. 2 is a block diagram of a conventional OFDM relay terminal employing DF.

A DF block 668 includes a subcarrier symbol mapper 662, a decoder & encoder 664, and a detector 660, for DF implementation. The subcarrier symbol mapper 662, the decoder and encoder 664, and the detector 660 operate in the same manner as their counterparts illustrated in FIG. 2.

An AF block 680 amplifies a subcarrier received from the OFDM demodulator 120, for AF implementation.

A multiplexer 690 multiplexes the symbols of subcarriers buffered in a buffer 670 and provides the multiplexed symbols to the OFDM modulator 110.

Figure 1:
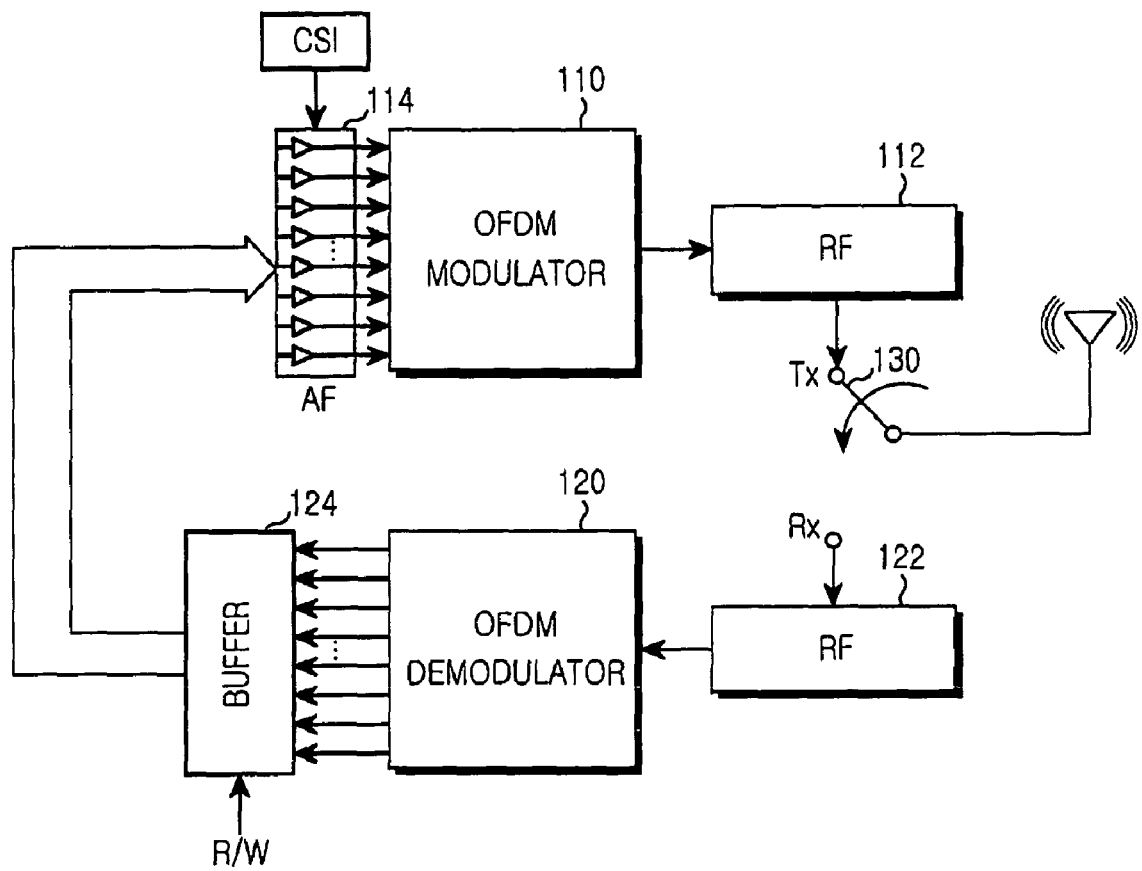
FIG. 1 is a block diagram of a conventional OFDM relay terminal employing AF.

The OFDM modulator 110, the OFDM demodulator 120, and the RF processors 112 and 122 function in the same manner as the counterparts illustrated in FIG. 1.

Figure 7:
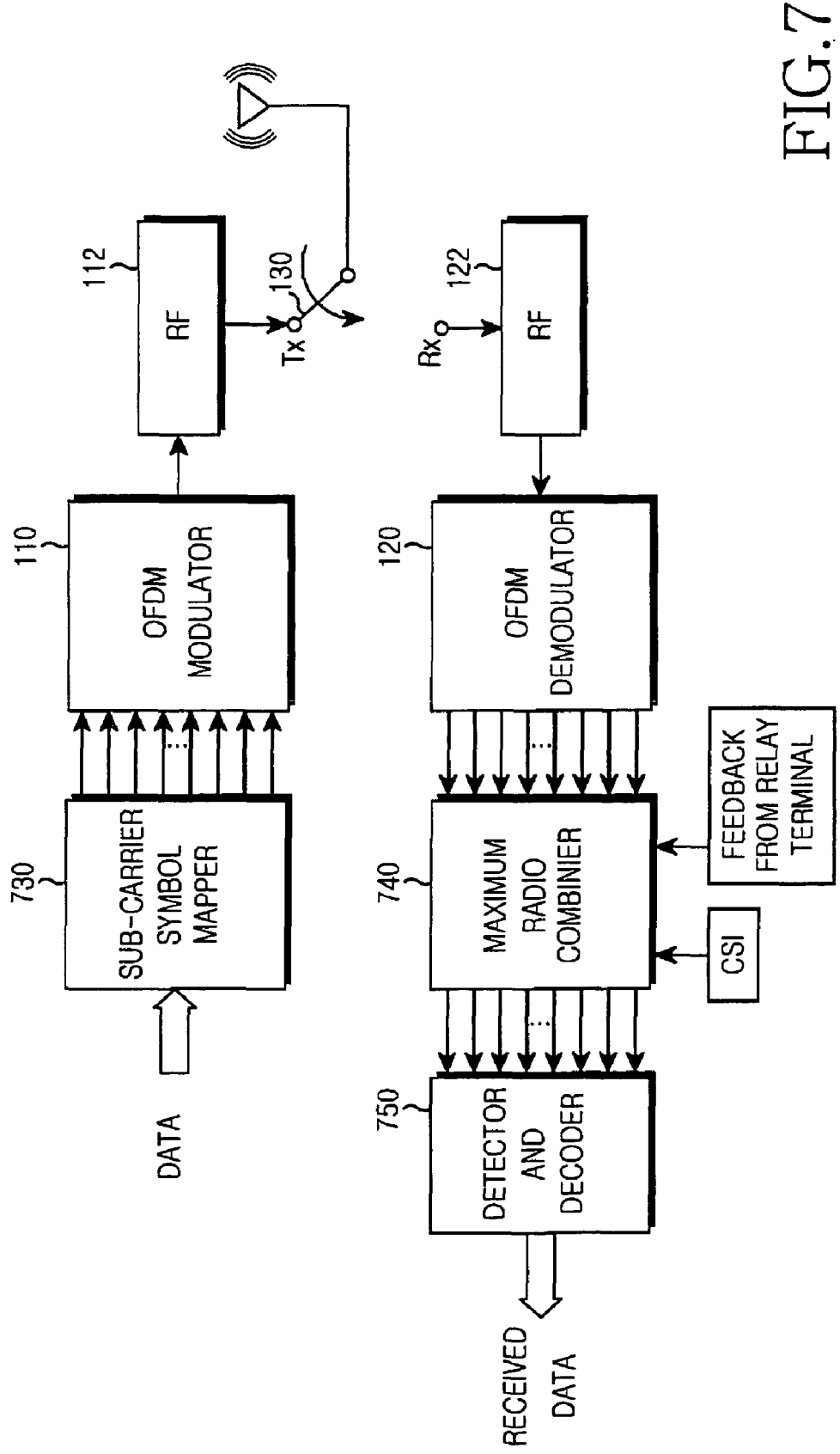
FIG. 7 is a block diagram of a destination terminal according to the present invention.

FIG. 7 is a block diagram of the destination terminal according to the present invention.

Referring to FIG. 7, a maximum radio combiner 740 determines a combining scheme for the symbols of subcarriers based on a forwarding scheme informed by the relay terminal. The determination can be made based on the CSIs of the subcarriers.

Upon receipt of data on subcarriers for which the source terminal employs channel coding, a detector and decoder 750 decodes the received data.

A subcarrier symbol mapper 730 maps received data to subcarriers in parallel and provides the mapped data to the OFDM modulator 110.

The OFDM modulator 110, the OFDM demodulator 120, the RF processors 112 and 122, and the RF switch 130 function in the same manner as the counterparts illustrated in FIG. 1.

Figure 8:
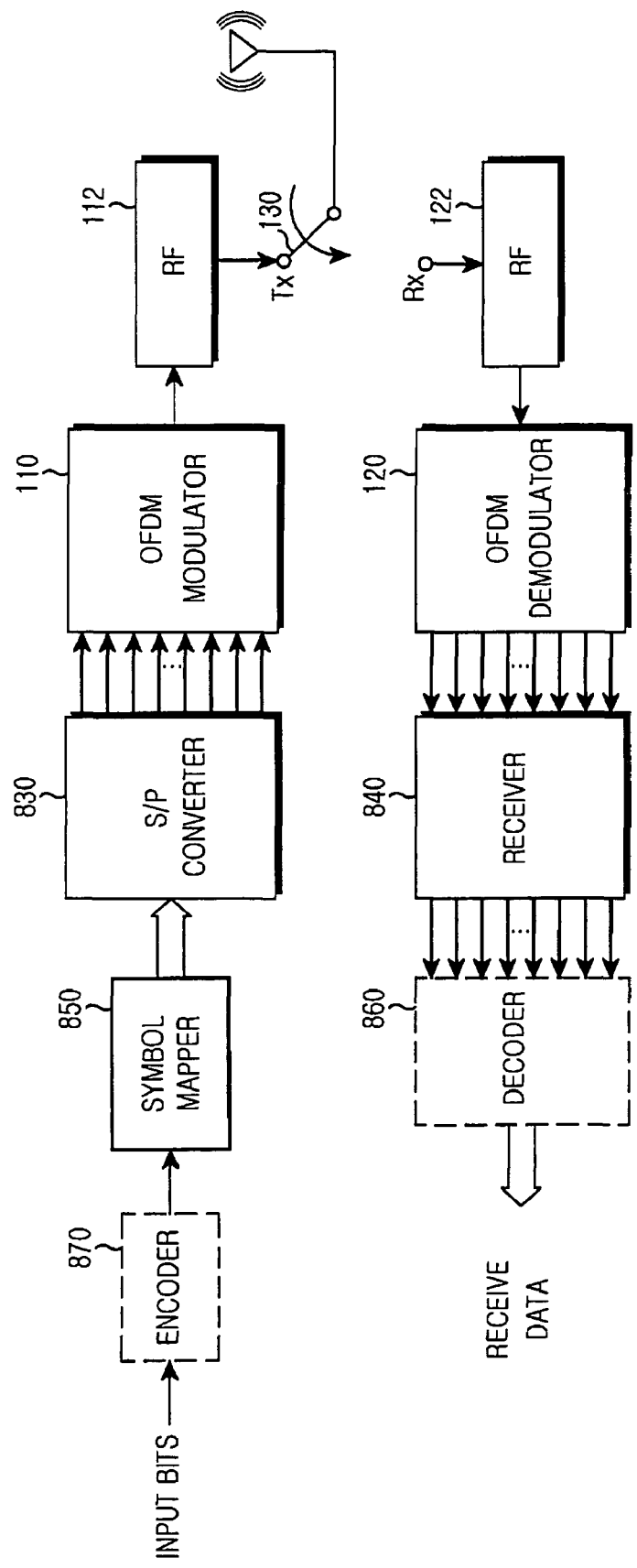
FIG. 8 is a block diagram of a source terminal according to the present invention.

FIG. 8 is a block diagram of the source terminal according to the present invention.

Referring to FIG. 8, an encoder 870 encodes received data. A symbol mapper 850 maps the coded data to subcarriers. A Serial-to-Parallel (S/P) converter 830 converts the serial mapped data to parallel data and provides the parallel data to the OFDM modulator 110.

A receiver 840 receives data from the OFDM demodulator 120. A decoder 860, if the data received from the receiver 840 was channel-encoded in the source terminal, decodes the data.

The OFDM modulator 110, the OFDM demodulator 120, the RF processors 112 and 122, and the RF switch 130 function in the same manner as the counterparts illustrated in FIG. 1.

Figure 9:
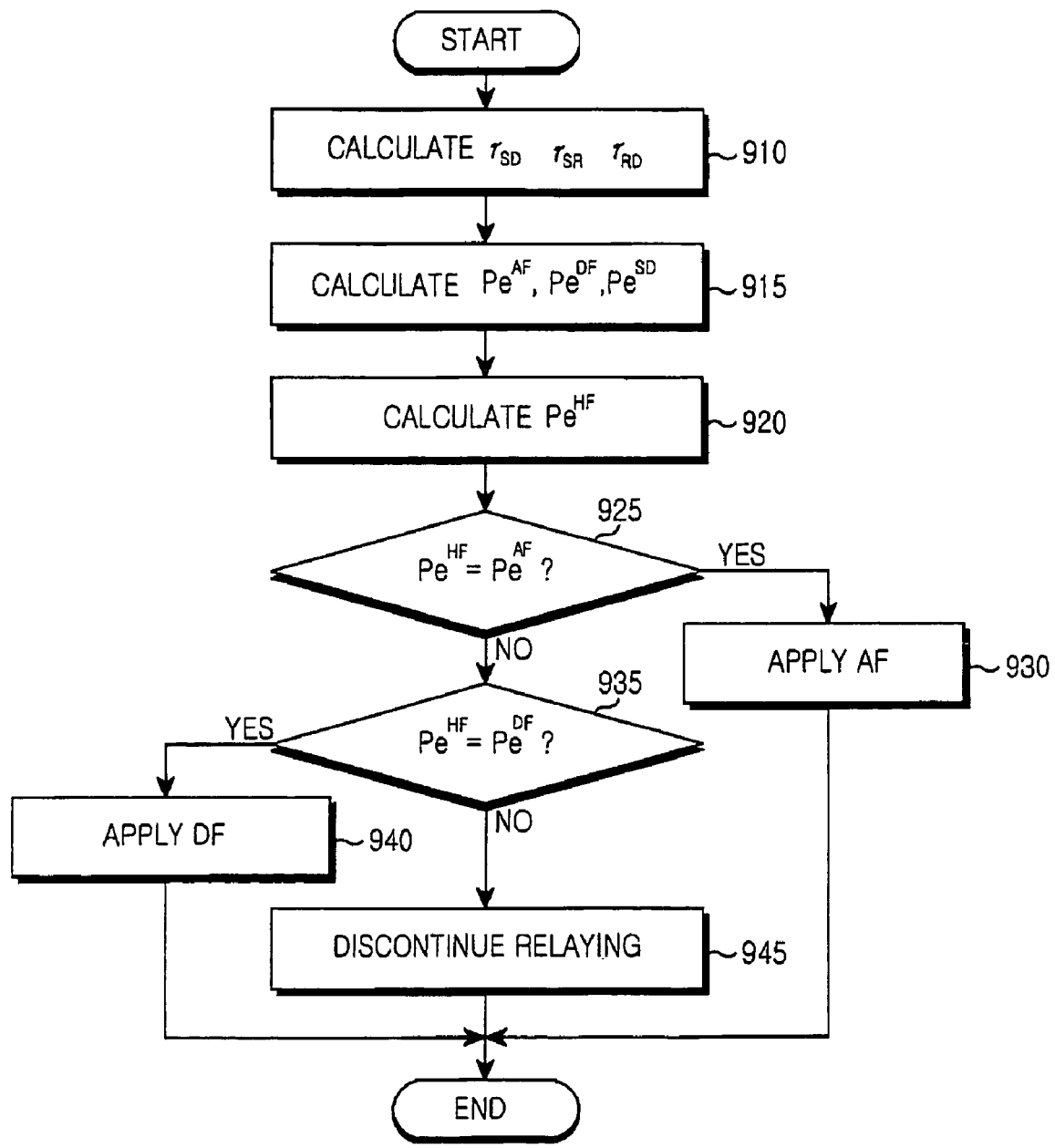
FIG. 9 is a flowchart illustrating an operation of the relay terminal according to the present invention.

FIG. 9 is a flowchart illustrating an operation of the relay terminal according to the present invention.

Referring to FIG. 9, the relay terminal 320 receives a symbol on a subcarrier from the source terminal 310 and calculates $\gamma_{SR}$, $\gamma_{SD}$ and $\gamma_{RD}$ for the subcarrier in step 910.

The relay terminal 320 calculates $P_e^{AF}$, $P_e^{DF}$ and $P_e^{SD}$ by Equations (1), (2) and (3) in step 915 and calculates PeHF using $P_e^{AF}$, $P_e^{DF}$ and $P_e^{SD}$ by Equation (4) in step 920.

In step 925, the relay terminal 320 determines whether $P_e^{HF}=P_e^{AF}$. If $P_e^{HF}=P_e^{AF}$, the relay terminal 320 selects AF for the symbol of the subcarrier in step 930. If $P_e^{HF}=P_e^{DF}$ in step 935, the relay terminal 320 selects DF for the symbol of the subcarrier in step 940. On the other hand, if $P_e^{HF} \neq P_e^{DF}$ in step 935, which implies that $P_e^{HF}=P_e^{SD}$, the relay terminal 320 discontinues relaying in step 945 and then terminates the process of the present invention.

Figure 10:
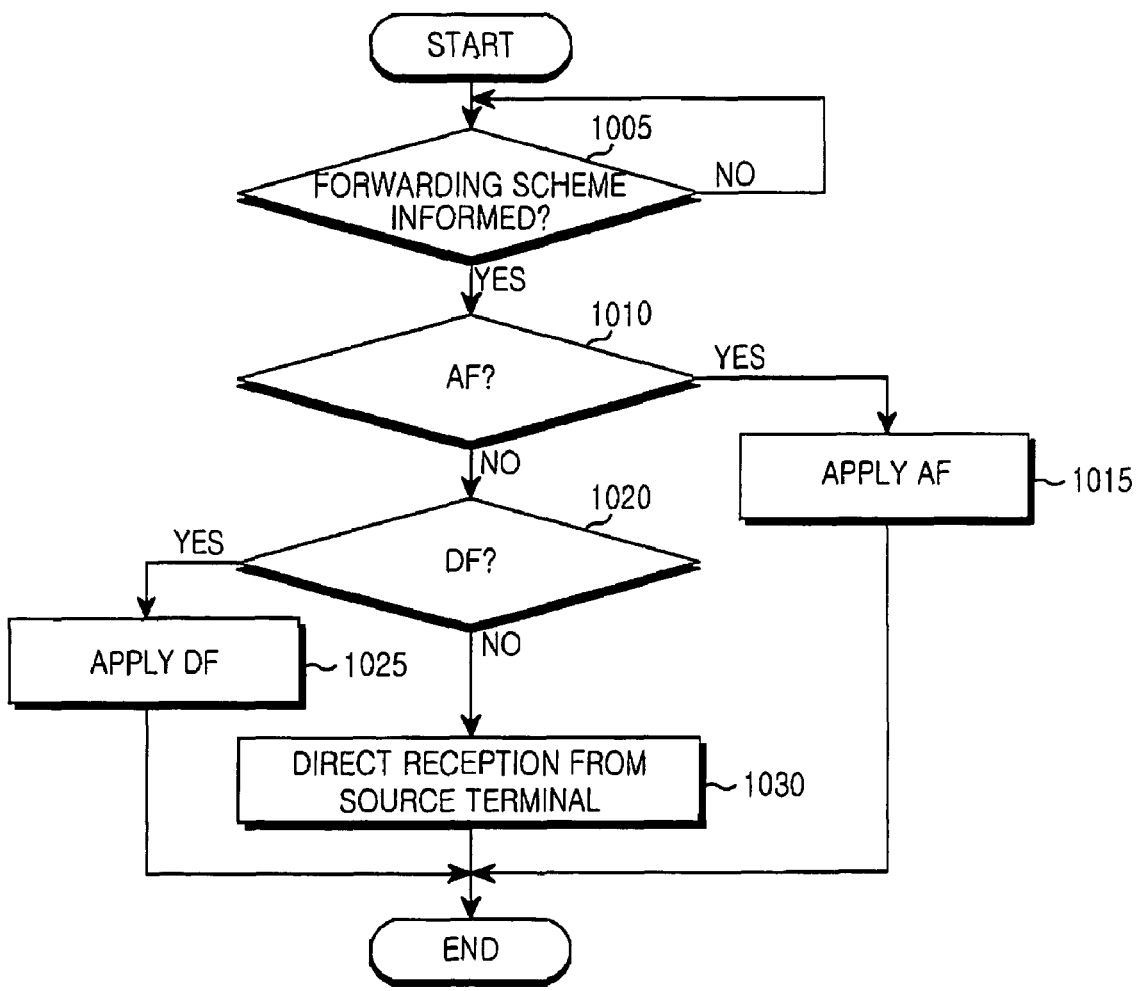
FIG. 10 is a flowchart illustrating an operation of the destination terminal according to the present invention.

FIG. 10 is a flowchart illustrating an operation of the destination terminal according to the present invention.

Referring to FIG. 10, upon receipt of information indicating a selected forwarding scheme from the relay terminal 320 in step 1005, the destination terminal 330 determines whether the forwarding scheme is AF in step 1010.

In the case of AF, the destination terminal 330 applies AF in step 1015. If the forwarding scheme is not AF, the destination terminal 330 determines whether it is DF in step 1020. If it is DF, the destination terminal 330 applies DF in step 1025.

If the forwarding scheme is not DF, the destination terminal 330 receives data directly from the source terminal 310 in step 1030 and terminates the process of the present invention.

A time delay is involved in application of AF or DF in hybrid forwarding of the relay terminal 320. The time delay of applying AF is denoted by $T_{AF}$ and the time delay of applying DF is denoted by $T_{DF}$.

For synchronization in the relay terminal 320, a guard time is required. The guard time is defined as the time between the end of transmission from the source terminal 310 to the start of forwarding from the relay terminal 320. Therefore, the guard time must be longer than $T_{AF}$ and $T_{DF}$.

Figure 11:
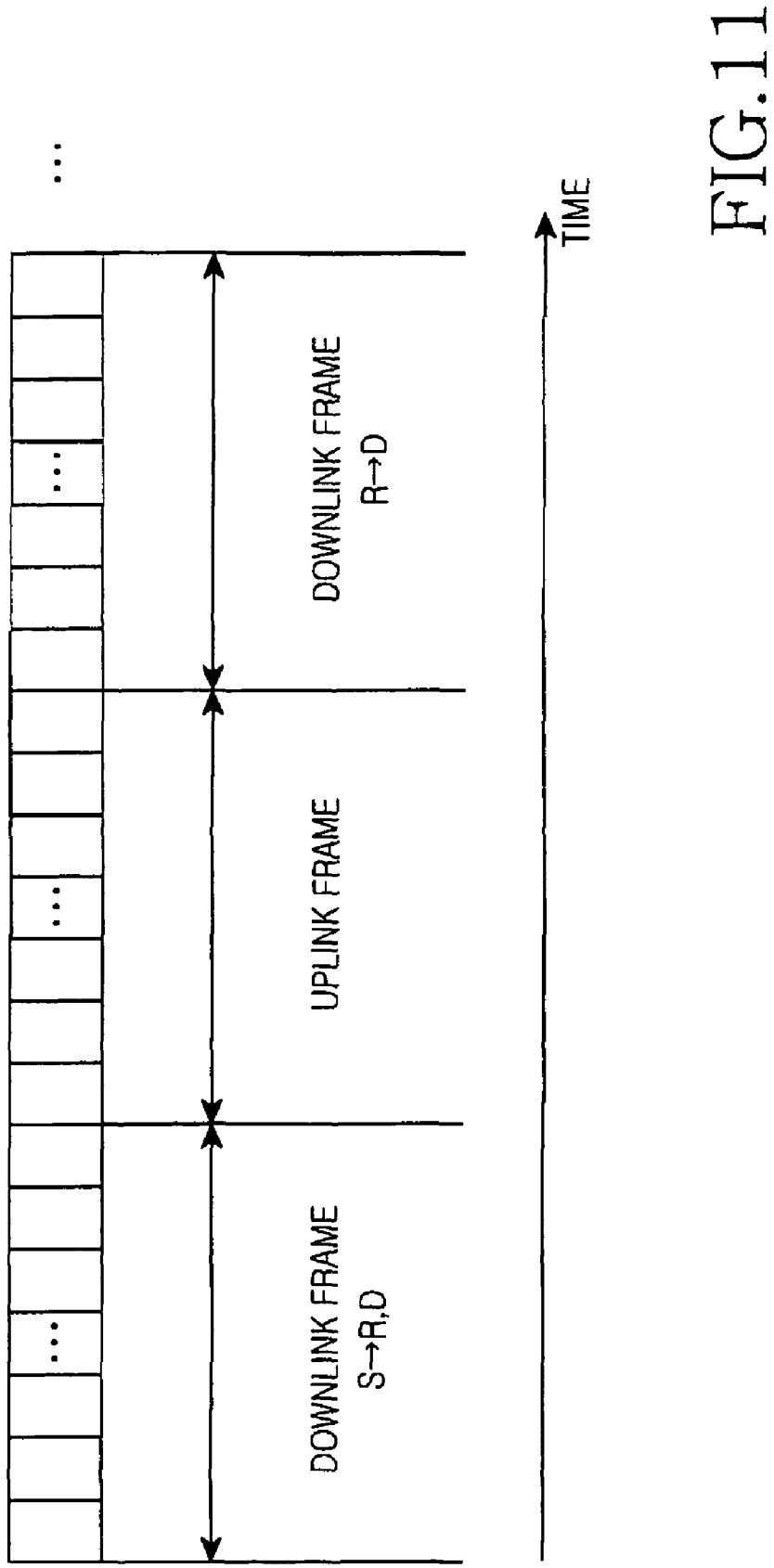
FIG. 11 illustrates downlink transmission and uplink transmission in an OFDM system according to the present invention.

FIG. 11 illustrates downlink transmission and uplink transmission in an OFDM system according to the present invention.

Referring to FIG. 11, each of uplink and downlink frames includes a plurality of OFDM symbols. After transmitting the uplink frame, the relay terminal 320 starts to transmit the downlink frame.

In this case, the relay terminal 320 can use the transmission interval of the uplink frame for synchronization for subcarrier transmission in the next forwarding.

Simulation and theoretical results of the present invention are presented. Simulation conditions are illustrated in Table 1 below.

TABLE 1

| | |
|---|---|
| System bandwidth, B & carrier frequency | 20 MHz & 5 GHz |
| Number of subcarriers, N | 400 |
| S→R link: $\sigma_{SR}$, $B_c$ | 1.26 msec, 3 subcarriers |
| S→D link: $\sigma_{SD}$, $B_c$ | 0.23 msec, 17 subcarriers |
| R→D link: $\sigma_{SD}$, $B_c$ | 1.26 msec, 17 subcarriers |

In Table 1, $\sigma_{SR}$, $\sigma_{SD}$ and $\sigma_{SD}$ represent the Root Mean Square (RMS) delay spreads of the links, respectively. Frequency selective and mutually independent channels are considered for the links. $B_c$ represents coherence bandwidth in terms of the number of subcarriers.

Figure 12A:
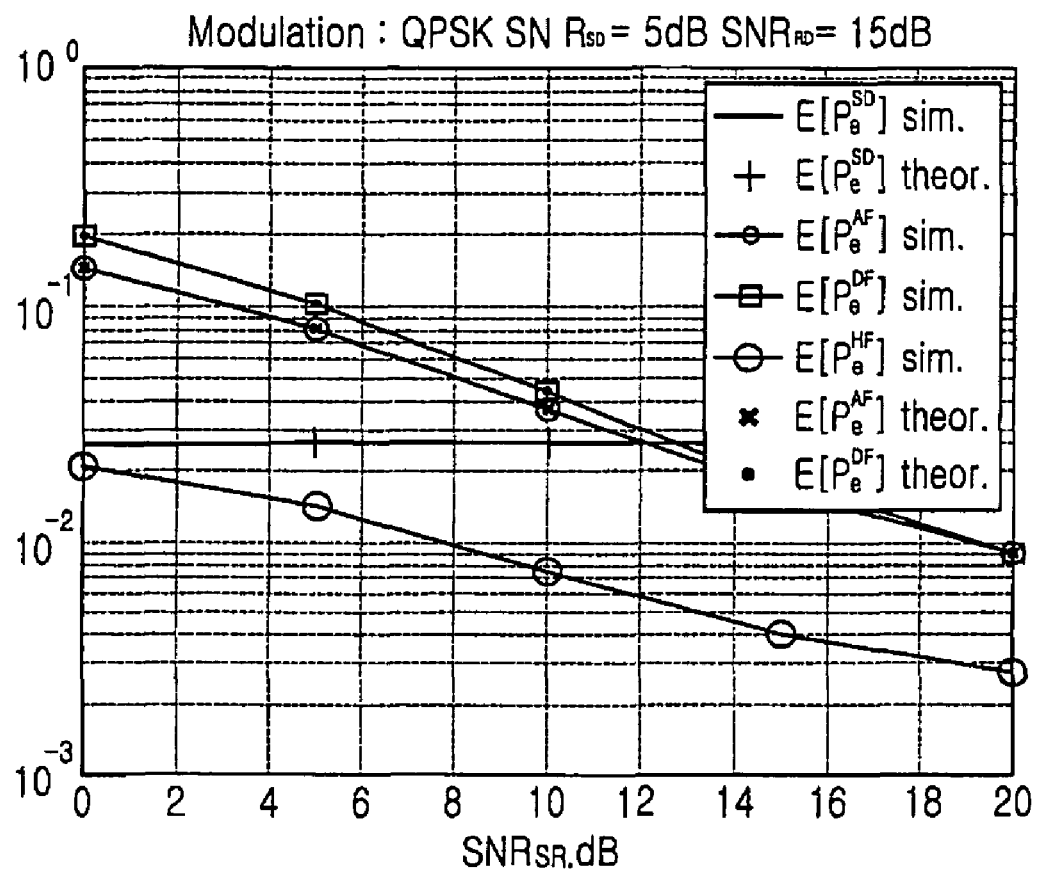
FIGS. 12A and 12B are graphs comparing hybrid forwarding with direct transmission in terms of performance.
Figure 12B:
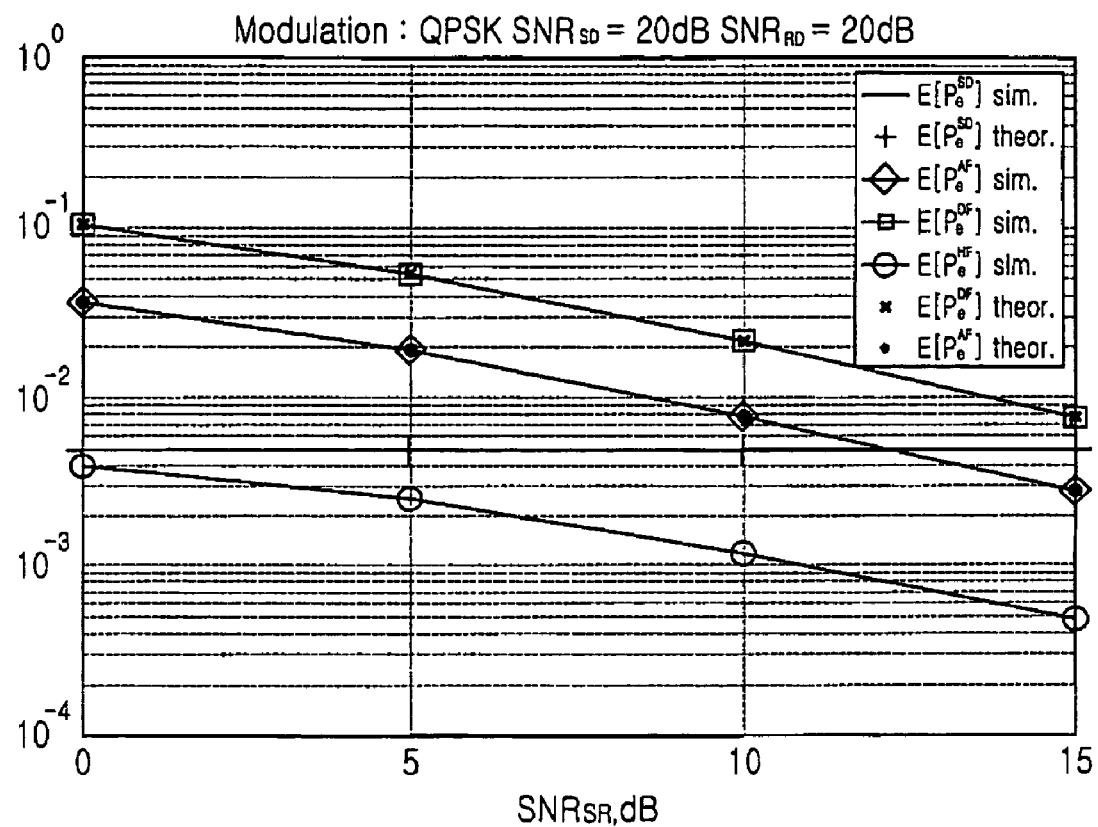

FIGS. 12A and 12B are graphs comparing hybrid forwarding with direct transmission in terms of performance. In FIGS. 12A and 12B, the term E[ ] stands for an expected BER. For instance, $E[P_e^{SD}]$ represents expected BERs of subcarriers on the S→D link. $SNR_{SR}$, $SNR_{SD}$, and $SNR_{RD}$ represent the SNRs of the S→R, S→D and R→D links, respectively. The vertical axis represents BER.

FIG. 12A is a graph illustrating expected BERs when $SNR_{SR}=SNR_{SD}=5$ dB and $SNR_{RD}=15$ dB.

Referring to FIG. 12A, the hybrid forwarding of the present invention offers a gain of about 12 dB at a BER of 1/100, compared to the conventional AF scheme or the conventional DF scheme.

FIG. 12B is a graph illustrating expected BERs when $SNR_{SR}=SNR_{SD}=SNR_{RD}=20$ dB.

Referring to FIG. 12B, at a BER of 3/1000, the hybrid forwarding of the present invention offers a gain of 13 dB over the conventional AF scheme and a gain of much more than 13 dB over the conventional DF scheme.

In accordance with the present invention as described above, a relay terminal calculates bit error probabilities according to the SNRs of communication links and selects an appropriate forwarding scheme based on the bit error probabilities. Therefore, a communication link with a lower BER and a higher data rate can be achieved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for relaying data in a relay terminal, comprising:
    a forwarding scheme selector for selecting a forwarding scheme for transmission;
    an amplify and forward (AF) block for amplifying data received from the forwarding scheme selector;
    a decode and forward (DF) block for decoding and encoding data received from the forwarding scheme selector; and
    a multiplexer for providing the output data of the AF block and the DF block to an OFDM modulator,
    wherein the forwarding scheme selector calculates bit error probabilities of an AF scheme, a DF scheme, and a direct transmission scheme without relaying based on channel state information (CSI) of received data, and selects the AF scheme, if the AF scheme has the lowest bit error probability.

2. The apparatus of claim 1, wherein the bit error probability of the AF scheme is given by $$P_e^{AF} = Q\left(\sqrt{\gamma_s^{AF}}\right), \gamma_s^{AF} = \frac{\left(\gamma_{SD} + \frac{\gamma_{SR}\gamma_{RD}}{1+\gamma_{SR}}\right)^2}{\gamma_{SD} + \frac{\gamma_{SR}\gamma_{RD}}{1+\gamma_{SR}} + \gamma_{SD} + \frac{\gamma_{RD}^2\gamma_{SR}}{(1+\gamma_{SR})^2}}$$

where $\gamma_{SR}$, $\gamma_{SD}$ and $\gamma_{RD}$ represent the signal-to-noise ratios (SNRs) of a symbol on a subcarrier in source-relay, source-destination, and relay-destination links, respectively.

3. The apparatus of claim 1, wherein the forwarding scheme selector selects the DF scheme, if the DF scheme has the lowest bit error probability.

4. The apparatus of claim 3, wherein the bit error probability of the DF scheme is given by $$P_e^{DF} = \begin{cases} (1-Q(\sqrt{\gamma_{SR}}))Q(\sqrt{\gamma_{SD}+\gamma_{RD}}) + Q\left(\frac{\sqrt{(\gamma_{SD}-\gamma_{RD})^2}}{\gamma_{SD}+\gamma_{RD}}\right)Q(\sqrt{\gamma_{SR}}), & \text{if } \gamma_{SD}-\gamma_{RD} \geq 0 \\ (1-Q(\sqrt{\gamma_{SR}}))Q(\sqrt{\gamma_{SD}+\gamma_{RD}}) + \left(1-Q\left(\frac{\sqrt{(\gamma_{SD}-\gamma_{RD})^2}}{\gamma_{SD}+\gamma_{RD}}\right)\right)Q(\sqrt{\gamma_{SR}}), & \text{if } \gamma_{SD}-\gamma_{RD} < 0 \end{cases}$$

where $\gamma_{SR}$, $\gamma_{SD}$ and $\gamma_{RD}$ represent the signal-to-noise ratios (SNRs) of a symbol on a subcarrier in the source-relay, source-destination, and relay-destination links, respectively.

5. The apparatus of claim 1, wherein the forwarding scheme selector selects the direct transmission scheme, if the direct transmission scheme has the lowest bit error probability.

6. The apparatus of claim 5, wherein the bit error probability of the direct transmission scheme is given by $$P_e^{SD} = \left\{Q\left(\sqrt{\frac{\gamma_{SD}+\gamma_{RD}}{2}}\right)\right\}$$

where $\gamma_{SD}$ and $\gamma_{RD}$ represent the SNRs of a symbol on a subcarrier in the source-destination and relay-destination links, respectively.

7. A method for relaying data in a relay terminal, comprising the steps of:
    calculating, relay terminal, bit error probabilities of an amplify and forward (AF) scheme, a decode and forward (DF) scheme, and a direct transmission scheme without relaying based on channel state information (CSI) of received data; and
    selecting the AF scheme, if the AF scheme has the lowest bit error probability.

8. The method of claim 7, wherein the bit error probability of the AF scheme is given by $$P_e^{AF} = Q\left(\sqrt{\gamma_s^{AF}}\right), \gamma_s^{AF} = \frac{\left(\gamma_{SD} + \frac{\gamma_{SR}\gamma_{RD}}{1+\gamma_{SR}}\right)^2}{\gamma_{SD} + \frac{\gamma_{SR}\gamma_{RD}}{1+\gamma_{SR}} + \gamma_{SD} + \frac{\gamma_{RD}^2\gamma_{SR}}{(1+\gamma_{SR})^2}}$$

where $\gamma_{SR}$, $\gamma_{SD}$ and $\gamma_{RD}$ represent the SNRs of a symbol on a subcarrier in source-relay, source-destination, and relay-destination links, respectively.

9. The method of claim 7, further comprising selecting the DF scheme, if the DF scheme has the lowest bit error probability.

10. The method of claim 9, wherein the bit error probability of the DF scheme is given by $$P_e^{DF} = \begin{cases} (1-Q(\sqrt{\gamma_{SR}}))Q(\sqrt{\gamma_{SD}+\gamma_{RD}}) + Q\left(\frac{\sqrt{(\gamma_{SD}-\gamma_{RD})^2}}{\gamma_{SD}+\gamma_{RD}}\right)Q(\sqrt{\gamma_{SR}}), & \text{if } \gamma_{SD}-\gamma_{RD} \geq 0 \\ (1-Q(\sqrt{\gamma_{SR}}))Q(\sqrt{\gamma_{SD}+\gamma_{RD}}) + \left(1-Q\left(\frac{\sqrt{(\gamma_{SD}-\gamma_{RD})^2}}{\gamma_{SD}+\gamma_{RD}}\right)\right)Q(\sqrt{\gamma_{SR}}), & \text{if } \gamma_{SD}-\gamma_{RD} < 0 \end{cases}$$

where $\gamma_{SR}$, $\gamma_{SD}$ and $\gamma_{RD}$ represent the signal-to-noise ratios (SNRs) of a symbol on a subcarrier in the source-relay, source-destination, and relay-destination links, respectively.

11. The method of claim 7, further comprising selecting the direct transmission scheme, if the direct transmission scheme has the lowest bit error probability.

12. The method of claim 11, wherein the bit error probability of the direct transmission scheme is given by $$P_e^{SD} = \left\{ Q\left(\sqrt{\frac{\gamma_{SD}+\gamma_{RD}}{2}}\right) \right\}$$

where $\gamma_{SD}$ and $\gamma_{RD}$ represent the SNRs of a symbol on a subcarrier in the source-destination and relay-destination links, respectively.

* * * * *